United States Patent
Li (10) Patent No.: US 12,096,070 B2
(45) Date of Patent: Sep. 17, 2024

(54) VIDEO EDITING METHOD AND SYSTEM THEREOF

(71) Applicant: ASUSTEK COMPUTER INC., Taipei (TW)

(72) Inventor: Chieh Li, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 84 days.

(21) Appl. No.: 17/965,128

(22) Filed: Oct. 13, 2022

(65) Prior Publication Data
US 2023/0308716 A1 Sep. 28, 2023

(30) Foreign Application Priority Data
Mar. 24, 2022 (TW) .................................. 111111007

(51) Int. Cl.
*H04N 21/44* (2011.01)
(52) U.S. Cl.
CPC ............................. *H04N 21/44008* (2013.01)
(58) Field of Classification Search
CPC .............................................. H04N 21/44008
See application file for complete search history.

(56) References Cited

U.S. PATENT DOCUMENTS

| | | | |
|---|---|---|---|
| 6,278,497 B1* | 8/2001 | Sumiyoshi | G11B 27/28 348/700 |
| 2011/0105857 A1* | 5/2011 | Zhang | H04N 21/44218 600/300 |
| 2015/0286820 A1* | 10/2015 | Sridhara | G06F 1/3206 713/320 |
| 2017/0153792 A1* | 6/2017 | Kapoor | G06F 3/04883 |
| 2017/0168465 A1 | 6/2017 | Chen | |
| 2017/0339338 A1 | 11/2017 | Gordon et al. | |
| 2020/0264727 A1* | 8/2020 | Lee | G06F 3/044 |
| 2020/0314330 A1 | 10/2020 | Takayama | |
| 2023/0315382 A1* | 10/2023 | Dai | H04M 3/56 715/727 |

FOREIGN PATENT DOCUMENTS

| CN | 106803987 A | 6/2017 |
|---|---|---|
| CN | 109672922 B | 10/2020 |
| CN | 111800648 A | 10/2020 |

* cited by examiner

*Primary Examiner* — Thai Q Tran
*Assistant Examiner* — Jose M Mesa
(74) *Attorney, Agent, or Firm* — MUNCY, GEISSLER, OLDS & LOWE, P.C.

(57) ABSTRACT

A video editing method applied to an electronic device is provided. The electronic device includes a processor and a human-machine interface, the processor is configured to execute a program to generate video data, and the human-machine interface is configured to receive an input signal. The video editing method includes: obtaining the video data; monitoring the input signal; setting an editing condition; and recording the video data to generate a video clip when the input signal meets the editing condition. A video editing system is further provided.

10 Claims, 5 Drawing Sheets

VIDEO EDITING METHOD AND SYSTEM THEREOF

CROSS-REFERENCE TO RELATED APPLICATION

This application claims the priority benefit of Taiwan application serial No. 111111007, filed on Mar. 24, 2022. The entirety of the above-mentioned patent application is hereby incorporated by reference herein and made a part of the specification.

BACKGROUND OF THE INVENTION

Field of the Invention

The disclosure relates to the field of video processing technologies, and in particular, to a video editing method and a system thereof.

Description of the Related Art

With the rapid development of online games, more and more players like to capture game videos, to review highlights of the games or share them with other players.

However, because the players need to concentrate on the games during the games, the videos captured by the players are entire game videos. The files thereof are too large, take too long time, and often include many boring clips, which is not conducive to sharing.

To produce short game clips suitable for sharing, the players often need to spend extra time manually editing the entire videos, which greatly increases their workload.

BRIEF SUMMARY OF THE INVENTION

The disclosure provides a video editing method, applied to an electronic device. The electronic device includes a processor, a human-machine interface, an editing condition setting unit, and a video editing unit, the processor is configured to execute a program to generate video data, the human-machine interface is configured to receive an input signal, the editing condition setting unit is configured to set an editing condition, and the video editing unit is configured to record the video data. The video editing method includes: obtaining the video data; monitoring the input signal; setting the editing condition through the editing condition setting unit; and recording, through the video editing unit, the video data to generate a video clip when the input signal meets the editing condition.

The disclosure further provides a video editing system, applied to an electronic device. The electronic device includes a processor and a human-machine interface, the processor is configured to execute a program to generate video data, and the human-machine interface is configured to receive an input signal. The video editing system includes a video obtaining module and a video editing module. The video obtaining module is configured to obtain the video data. The video editing module includes an editing condition setting unit and a video editing unit, and is configured to set an editing condition through the editing condition setting unit, and record, through the video editing unit, the video data to generate a video clip when the input signal meets the editing condition.

Through the video editing method and the system thereof provided in the disclosure, a period of time of a highlight clip in video data is determined according to an input signal of a user, such as a click frequency of a touch signal, a frequency of a sound signal, or a speech speed of a voice signal, to generate a video clip suitable for sharing. In this way, a player does not need to spend extra time editing an entire video, thereby effectively reducing workload.

DETAILED DESCRIPTION OF THE EMBODIMENTS

Figure 1:
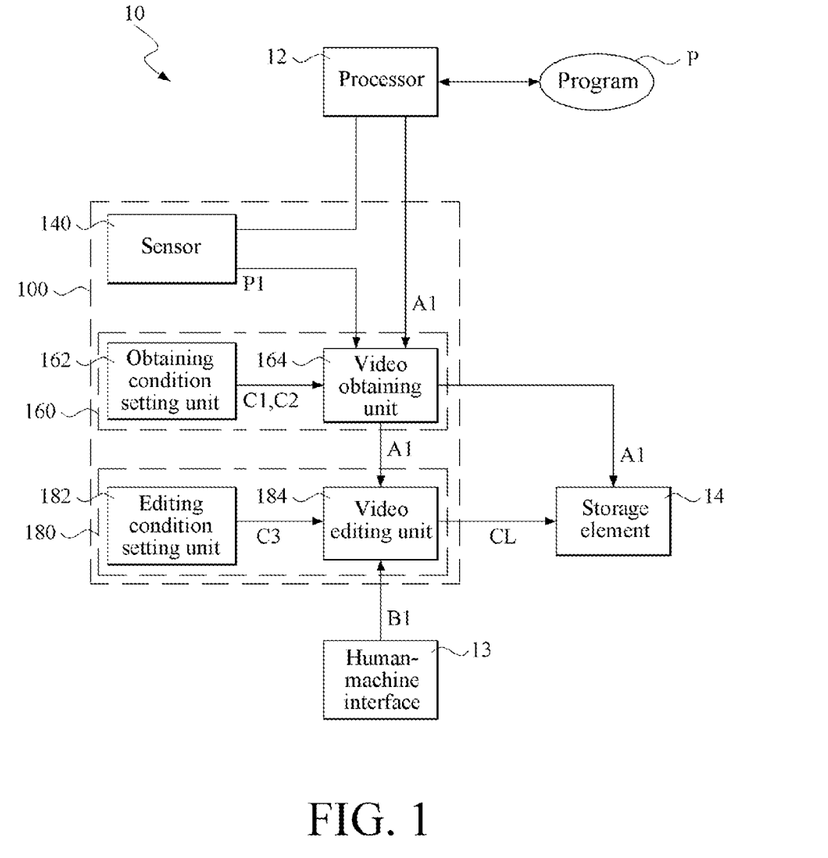
FIG. 1 is a schematic block diagram of a video editing system according to an embodiment of the disclosure.

Referring to FIG. 1, a video editing system 100 provided in the disclosure is applied to an electronic device 10, such as a smartphone, a tablet computer, a notebook computer, or a handheld game console. The electronic device 10 includes a processor 12, a human-machine interface 13, and a storage element 14.

The processor 12 is configured to execute a program P to generate video data A1. In an embodiment, the program P is a game program, and the video data A1 is game picture video data generated during execution of the game program.

The human-machine interface 13 is configured to receive an input signal B1. The processor 12 is a central processing unit (CPU) or a graphics processing unit (GPU). The human-machine interface 13 includes input devices such as a keyboard, a touch pad, a touch panel, a pressure sensor, an ultrasonic sensor, and a microphone. The storage element 14 is a random access memory (RAM), a solid state disk, or the like.

As shown in the figure, the video editing system 100 includes a sensor 140, a video obtaining module 160, and a video editing module 180.

The sensor 140 is configured to monitor an operating parameter P1 of the processor 12. In an embodiment, the sensor 140 is a sensing element on a mainboard, and is configured to detect data such as an operating temperature, an operating frequency, or an operating voltage of the CPU. The foregoing operating parameter P1 is an operating temperature, an operating frequency, or an operating voltage of the processor 12, or an operating temperature, an operating frequency, or an operating voltage of a specific core in a multi-core processor.

The video obtaining module 160 includes an obtaining condition setting unit 162 and a video obtaining unit 164. The obtaining condition setting unit 162 is configured to set a video recording start condition C1 and a video recording end condition C2.

In an embodiment, the obtaining condition setting unit 162 correspondingly sets the video recording start condition C1 and the video recording end condition C2 according to a type of the program P. In an embodiment, the obtaining condition setting unit 162 provides an interface for a user to autonomously adjust the video recording start condition C1 and the video recording end condition C2.

The video obtaining unit 164 of the video obtaining module 160 starts to obtain the video data A1 when the operating parameter P1 meets the video recording start condition C1, and stops obtaining the video data A1 when the operating parameter P1 meets the video recording end condition C2. In an embodiment, the video obtaining unit 164 stops obtaining the video according to a termination signal or a suspension signal. The termination signal or the suspension signal is from a swipe gesture or a keying signal.

In an embodiment, the video obtaining module 160 first determines whether the electronic device 10 executes the program P, and after it is determined that the electronic device 10 executes the program P, the video obtaining unit 164 then sets the video recording start condition C1 and the video recording end condition C2 according to the program P.

In an embodiment, the video obtaining module 160 includes a software program, and the software program is executed by the processor 12 to set the video recording start condition C1 and the video recording end condition C2, and obtain the video data A1. The video data A1 obtained by the video obtaining module 160 is stored in the storage element 14 or is uploaded through a network and shared with other players.

In an embodiment, the operating parameter P1 is the operating temperature of the processor 12, and the video recording start condition C1 is set as that the operating temperature is higher than a preset temperature. When the operating temperature of the processor 12 is higher than the preset temperature, the video obtaining unit 164 starts to obtain the video data A1. The video recording end condition C2 is set as that the operating temperature is lower than a preset temperature. When the operating temperature of the processor 12 is lower than the preset temperature, the video obtaining unit 164 stops obtaining the video data A1.

In an embodiment, the operating parameter P1 is the operating frequency of the processor 12, and the video recording start condition C1 is set as that the operating frequency is higher than a preset frequency. When the operating frequency of the processor 12 is higher than the preset frequency, the video obtaining unit 164 starts to obtain the video data A1. The video recording end condition C2 is set as that the operating frequency is lower than a preset frequency. When the operating frequency of the processor 12 is lower than the preset frequency, the video obtaining unit 164 stops obtaining the video data A1.

According to actual requirements, the preset temperature or a preset condition set by the video recording start condition C1 is the same as the preset temperature or a preset condition set by the video recording end condition C2, or different from the preset temperature or the preset condition set by the video recording end condition C2.

In an embodiment, the operating parameter P1 is operating temperatures of a plurality of cores in the multi-core processor, such as operating temperatures of a big core and a little core. The video recording start condition C1 is set as that the operating temperature of the big core is higher than a first preset temperature and the operating temperature of the little core is higher than a second preset temperature. The video recording end condition C2 is set as that the operating temperature of the big core is lower than the first preset temperature and the operating temperature of the little core is lower than the second preset temperature. The foregoing first preset temperature and second preset temperature are set to different values.

In an embodiment, cores targeted by the video recording start condition C1 and the video recording end condition C2 are different. In an embodiment, the video recording start condition C1 is set as that operating temperatures of the plurality of cores are all higher than a preset temperature, and the video recording end condition C2 is set as that an operating temperature of one of the plurality of cores is lower than the preset temperature.

In an embodiment, the operating parameter P1 is operating frequencies of a plurality of cores in the multi-core processor, such as operating frequencies of a big core and a little core. The video recording start condition C1 is set as that the operating frequency of the big core is higher than a first preset frequency and the operating frequency of the little core is higher than a second preset frequency. The video recording end condition C2 is set as that the operating frequency of the big core is lower than the first preset frequency and the operating frequency of the little core is lower than the second preset frequency. The foregoing first preset frequency and second preset frequency are set to different values.

In an embodiment, cores targeted by the video recording start condition C1 and the video recording end condition C2 are different. In an embodiment, the video recording start condition C1 is set as that operating frequencies of the plurality of cores are all higher than a preset frequency, and the video recording end condition C2 is set as that an operating frequency of one of the plurality of cores is lower than the preset frequency.

The video editing module 180 includes an editing condition setting unit 182 and a video editing unit 184. The editing condition setting unit 182 is configured to set an editing condition C3.

In an embodiment, the editing condition setting unit 182 correspondingly sets the editing condition C3 according to a type of the program P. The video editing unit 184 is configured to record the video data A1 to generate a video clip CL when the input signal B1 meets the editing condition C3. The video clip CL is stored in the storage element 14 or is uploaded through a network and shared with other players. In an embodiment, the video editing unit 184 first records the time when the input signal B1 meets the editing condition C3. When video records are subsequently arranged, the video editing unit generates the video clip CL by using the time record.

In an embodiment, when the input signal B1 is a touch signal, the editing condition setting unit 182 sets the editing condition C3 as that a click frequency of the touch signal is higher than a preset frequency. In this way, the video editing unit 184 captures the video data A1 in a period of time during which the click frequency of the touch signal is higher than the preset frequency as a highlight clip.

In an embodiment, when the input signal B1 is a sound signal, the editing condition setting unit 182 sets the editing condition C3 as that a volume of the sound signal is greater than a preset volume. In this way, the video editing unit 184 captures the video data A1 in a period of time during which the volume of the sound signal is greater than the preset volume as a highlight clip.

In an embodiment, when the input signal B1 is a voice signal, the editing condition setting unit 182 sets the editing condition C3 as that a speech speed corresponding to the voice signal is higher than a preset speech speed. In this way, the video editing unit 184 captures the video data A1 in a period of time during which the speech speed corresponding to the voice signal is higher than the preset speech speed as a highlight clip.

In the foregoing embodiments, the editing condition C3 corresponds to an input signal B1 received by a single input device. In other embodiments, the editing condition C3 simultaneously corresponds to input signals B1 received by a plurality of input devices.

In an embodiment, the editing condition C3 is set as that a click frequency of a touch signal received by a touch pad is higher than a preset frequency, or a volume of a sound signal received by a microphone is greater than a preset volume. As long as one of the two conditions is valid, a record is kept.

Players have different determinations on highlight clips. Therefore, in an embodiment, the editing condition setting unit 182 pre-collects a plurality of execution processes of programs P and highlight clips recognized by the players, analyzes features corresponding to the highlight clips therefrom, and then sets an editing condition C3 by using these features, to ensure that highlight clips required by the players are effectively edited under the editing condition C3.

Generally, a highlight clip in the video data A1 is within a period of time during which a player is in high spirits or a period of time during which the player has a relatively fierce operational action. The video editing system 100 of the disclosure determines a period of time of the highlight clip according to the input signal B1 detected by the human-machine interface 13, to generate the video clip CL, thereby effectively reducing the load of subsequently editing a video by a player.

Figure 2:
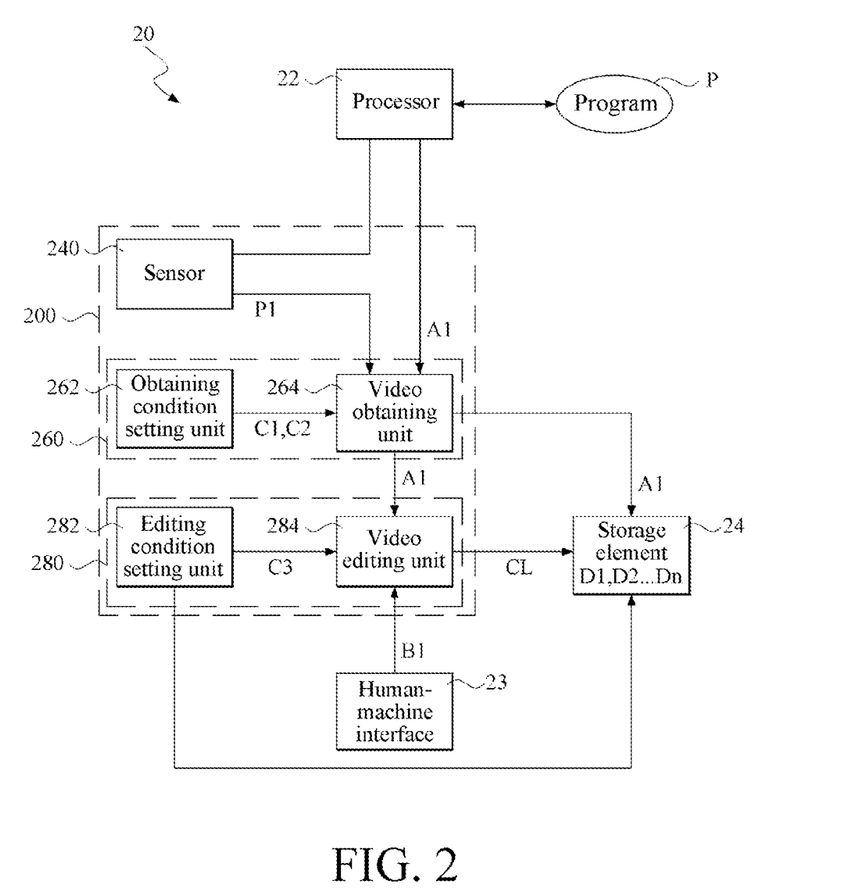
FIG. 2 is a schematic block diagram of a video editing system according to another embodiment of the disclosure.

FIG. 2 is a schematic block diagram of a video editing system according to another embodiment of the disclosure. A video editing system 200 is applied to an electronic device 20. The electronic device 20 includes a processor 22, a human-machine interface 23, and a storage element 24. The processor 22 is configured to execute a program P to generate video data A1. The human-machine interface 23 is configured to receive an input signal B1. The processor 22 is a CPU or a GPU.

The human-machine interface 23 includes input devices such as a keyboard, a touch pad, a touch panel, a pressure sensor, an ultrasonic sensor, and a microphone. The storage element 24 stores a plurality of preset editing conditions D1, D2, Dn corresponding to a plurality of preset programs. The storage element 24 is a RAM or a solid state disk.

As shown in the figure, the video editing system 200 includes a sensor 240, a video obtaining module 260, and a video editing module 280.

The sensor 240 is configured to monitor an operating parameter P1 of the processor 22. In an embodiment, the sensor 240 is a sensing element on a mainboard, and is configured to detect data such as an operating temperature, an operating frequency, or an operating voltage of the CPU. The foregoing operating parameter P1 is an operating temperature, an operating frequency, or an operating voltage of the processor, or an operating temperature, an operating frequency, or an operating voltage of a specific core in a multi-core processor.

The video obtaining module 260 includes an obtaining condition setting unit 262 and a video obtaining unit 264. The obtaining condition setting unit 262 is configured to set a video recording start condition C1 and a video recording end condition C2. When the operating parameter P1 meets the video recording start condition C1, the video obtaining unit 264 of the video obtaining module 260 starts to obtain the video data A1. When the operating parameter P1 meets the video recording end condition C2, the video obtaining unit 264 of the video obtaining module 260 stops obtaining the video data A1.

The video editing module 280 includes an editing condition setting unit 282 and a video editing unit 284. The editing condition setting unit 282 captures, according to the program P, a preset editing condition corresponding to the executed program P from the storage element 24 as the editing condition C3. Subsequently, the video editing unit 284 of the video editing module 280 records the video data A1 to generate a video clip CL when the input signal B1 meets the editing condition C3.

In an embodiment, the video editing module 280 includes a software program, and the software program is executed by the processor 22 to set the editing condition C3, record the video data A1, and generate the video clip CL. The video clip CL obtained by the video editing unit 284 of the video editing module 280 is stored in the storage element 24 or is uploaded through a network and shared with other players.

Because features of highlight clips generated during execution of various different programs P are different, the video editing system 200 provided in this embodiment sets different preset editing conditions D1, D2, Dn for different programs P, to respond to differences between the various different programs P, thereby ensuring that the video editing system 200 provided in this embodiment effectively edits highlight clips in each case of being applied to different programs P.

Figure 3:
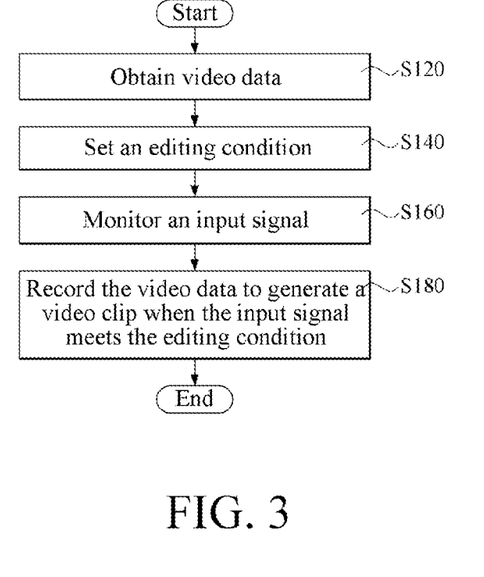
FIG. 3 is a flowchart of a video editing method according to an embodiment of the disclosure.

FIG. 3 is a flowchart of a video editing method according to an embodiment of the disclosure. The video editing method is applied to an electronic device such as the electronic device 10 in FIG. 1. The electronic device 10 executes a program P to generate video data A1. The video editing method includes the following steps.

First, as described in step S120, the video data A1 is obtained. Referring to FIG. 1 together, step S120 is performed by a video obtaining module 160. In an embodiment, the video obtaining module 160 enables a video obtaining function according to an enabling signal inputted by a user.

Next, as described in step S140, an editing condition C3 is set. In an embodiment, in step S140, the editing condition C3 is correspondingly set according to a type of the program P. Referring to FIG. 1 together, step S140 is performed by an editing condition setting unit 182.

Then, as described in step S160, an input signal B1 is monitored. The input signal B1 corresponds to the editing condition C3. In an embodiment, when the input signal B1 is a touch signal, the editing condition C3 is set as that a click frequency of the touch signal is higher than a preset frequency. When the input signal B1 is a sound signal, the editing condition C3 is set as that a volume of the sound signal is greater than a preset volume. When the input signal B1 is a voice signal, the editing condition C3 is set as that a speech speed corresponding to the voice signal is higher than a preset speech speed. Referring to FIG. 1 together, step S160 is performed by a video editing unit 184.

Then, as described in step S180, the video data A1 is recorded to generate a video clip CL when the input signal B1 meets the editing condition C3. Referring to FIG. 1 together, step S180 is performed by the video editing unit 184. The video clip CL generated in the foregoing step S180 is stored in the storage element 14 or is uploaded through a network and shared with other players.

In the video editing method of this embodiment, a period of time of the highlight clip is automatically determined according to the input signal B1 detected by the human-machine interface 13, to generate the video clip CL, so that the user does not need to intervene in the operation, thereby effectively reducing the load of editing a video by the user.

Figure 4:
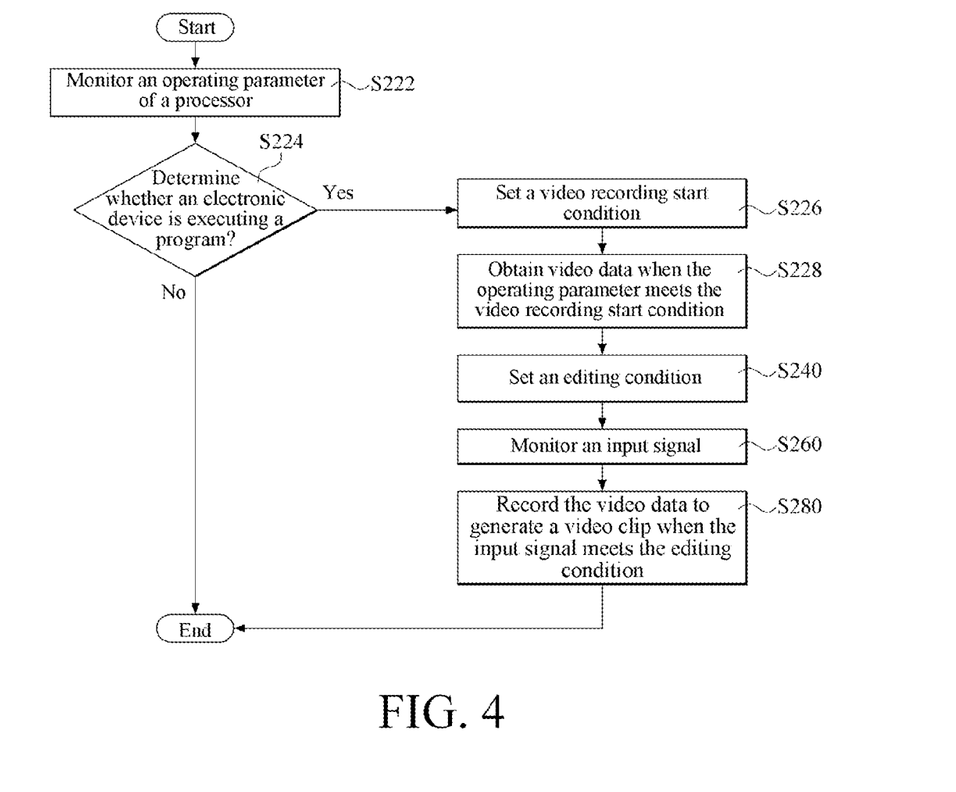
FIG. 4 is a flowchart of a video editing method according to another embodiment of the disclosure.

FIG. 4 is a flowchart of a video editing method according to another embodiment of the disclosure. The video editing method is applied to an electronic device such as the electronic device 10 in FIG. 1, and includes the following steps.

First, as described in step S222, an operating parameter P1 of a processor 12 is monitored. An object monitored in step S222 is a CPU or a GPU. The monitored operating parameter P1 is an operating temperature, an operating frequency, or an operating voltage of the processor 12. Referring to FIG. 1 together, step S222 is performed by a sensor 140.

Then, as described in step S224, it is determined whether the electronic device 10 executes a program P. When the electronic device 10 executes the program P, the process proceeds to step S226; otherwise, the process ends.

When it is determined that the electronic device 10 executes the program P, as described in step S226, a video recording start condition C1 is set according to the program P. The video recording start condition C1 corresponds to the operating parameter P1. In an embodiment, when the operating parameter P1 is the operating temperature of the processor 12, the video recording start condition C1 is set as that the operating temperature is higher than a preset temperature. When the operating parameter P1 is the operating frequency of the processor 12, the video recording start condition C1 is set as that the operating frequency is higher than a preset frequency. Referring to FIG. 1 together, step S224 and step S226 are performed by an obtaining condition setting unit 162.

Next, as described in step S228, when the operating parameter P1 meets the video recording start condition C1, video data A1 starts to be obtained. Referring to FIG. 1 together, step S228 is performed by a video obtaining unit 164.

The following step S240, step S260, and step S280 in this embodiment are the same as the step S140, step S160, and step S180 in the embodiment of FIG. 3. Details are not described herein.

Compared with the embodiment of FIG. 3, the video editing method of this embodiment includes step S224 of determining whether the program P is being executed, thereby avoiding enabling a video recording function and causing a malfunction in a case that any heavy-load program (in an embodiment, a drawing program) other than the program P is executed. The video editing method of this embodiment further includes step S226 of setting the video recording start condition C1 according to the program P and step S228 of automatically obtaining the video data A1, so that a user does not need to manually enable the video recording function, to ensure that the video data A1 is completely recorded, thereby facilitating subsequent video editing.

Figure 5:
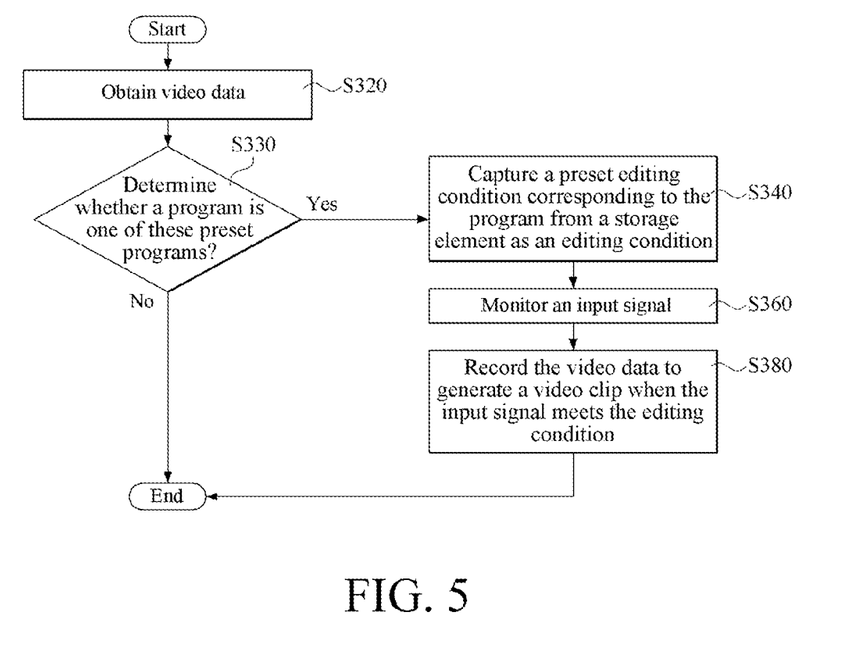
FIG. 5 is a flowchart of a video editing method according to still another embodiment of the disclosure.

FIG. 5 is a flowchart of a video editing method according to another embodiment of the disclosure. The video editing method is applied to an electronic device such as the electronic device 20 in FIG. 2. The electronic device 20 executes a program P, and a storage element 24 thereof stores a plurality of preset editing conditions D1, D2, ..., Dn corresponding to a plurality of preset programs. The video editing method includes the following steps.

First, as described in step S320, video data A1 is obtained. Referring to FIG. 2 together, step S320 is performed by a video obtaining module 260.

Then, as described in step S330, it is determined whether a program P is one of these preset programs. The storage element 24 stores the plurality of preset editing conditions D1, D2, ..., Dn corresponding to these preset programs. When the program P is one of these preset programs, the process proceeds to step S340 of capturing a preset editing condition corresponding to the program P from the storage element 24 as an editing condition C3; otherwise, the process ends without enabling a video editing function. Referring to FIG. 2 together, step S330 and step S340 are performed by an editing condition setting unit 282.

After the editing condition C3 is set, as described in step S360, an input signal B1 is monitored during execution of the program P. Referring to FIG. 2 together, step S360 is performed by a video editing unit 284.

Then, as described in step S380, the video data A1 is recorded to generate a video clip CL when the input signal B1 meets the editing condition C3. Referring to FIG. 2 together, step S380 is performed by the video editing unit 284.

Because features of highlight clips generated during execution of various different programs P are different, compared with the video editing method provided in FIG. 3, in the video editing method provided in this embodiment, different preset editing conditions D1, D2, Dn are set for different programs P, to respond to differences between the various different programs P, thereby ensuring that highlight clips are effectively edited in each case of executing different programs P.

Through the video editing method and the system thereof provided in the disclosure, a period of time of a highlight clip in video data is determined according to an input signal of a user, such as a click frequency of a touch signal, a frequency of a sound signal, or a speech speed of a voice signal, to generate a video clip suitable for sharing. In this way, a player does not need to spend extra time editing an entire video, thereby effectively reducing workload.

The above is merely exemplary embodiments of the disclosure, and does not constitute any limitation on the disclosure. Any form of equivalent replacements or modifications to the technical means and technical content disclosed in the disclosure made by a person skilled in the art without departing from the scope of the technical means of the disclosure still fall within the content of the technical means of the disclosure and the protection scope of the disclosure.

What is claimed is:

1. A video editing method, applied to an electronic device, the electronic device comprising a processor, a human-machine interface, an editing condition setting unit, and a video editing unit, the processor being configured to execute a program to generate video data, the human-machine interface being configured to receive an input signal, the editing condition setting unit being configured to set an editing condition, the video editing unit being configured to record the video data, and the video editing method comprising:
   obtaining the video data;
   setting the editing condition through the editing condition setting unit;
   monitoring the input signal; and
   recording, through the video editing unit, the video data to generate a video clip when the input signal meets the editing condition,
   wherein said obtaining the video data comprises:
      monitoring an operating parameter of the processor;
      setting a video recording start condition through the editing condition setting unit according to the program; and
      obtaining the video data through the video editing unit when the operating parameter meets the video recording start condition.

2. The video editing method according to claim 1, wherein the input signal is a touch signal, and the editing condition is that a click frequency of the touch signal is higher than a preset frequency.

3. The video editing method according to claim 1, wherein the input signal is a sound signal, and the editing condition is that a volume of the sound signal is greater than a preset volume.

4. The video editing method according to claim 1, wherein the input signal is a voice signal, and the editing condition is that a speech speed corresponding to the voice signal is higher than a preset speech speed.

5. The video editing method according to claim 1, wherein the operating parameter is an operating frequency, and the video recording start condition is that the operating frequency is higher than a preset frequency.

6. The video editing method according to claim 1, wherein the operating parameter is an operating temperature, and the video recording start condition is that the operating temperature is higher than a preset temperature.

7. The video editing method according to claim 1, wherein the electronic device comprises a storage element, and the storage element stores a plurality of preset editing conditions corresponding to a plurality of preset programs.

8. The video editing method according to claim 7, further comprising:
determining whether the program is one of these preset programs, and capturing a preset editing condition corresponding to the program from the storage element as the editing condition when the program is one of these preset programs.

9. A video editing system, applied to an electronic device, the electronic device comprising a processor and a human-machine interface, the processor being configured to execute a program to generate video data, the human-machine interface being configured to receive an input signal, and the video editing system comprising:
a video obtaining module, configured to obtain the video data;
a video editing module, comprising an editing condition setting unit and a video editing unit, and configured to set an editing condition through the editing condition setting unit, and record, through the video editing unit, the video data to generate a video clip when the input signal meets the editing condition; and
a sensor configured to monitor an operating parameter of the processor,
wherein the video obtaining module includes an obtaining condition setting unit and a video obtaining unit, the obtaining condition setting unit is configured to set a video recording start condition through the editing condition setting unit, and the video obtaining unit is configured to obtain the video data when the operating parameter meets the video recording start condition.

10. The video editing system according to claim 9, further comprising:
a storage element, storing a plurality of preset editing conditions corresponding to a plurality of preset programs,
wherein the video editing module is configured to capture a preset editing condition corresponding to the program from the storage element as the editing condition.

* * * * *